United States Patent
Catahan, Jr. et al.

(10) Patent No.: US 8,473,399 B2
(45) Date of Patent: *Jun. 25, 2013

(54) INVOICE DATA OBJECT FOR A COMMON DATA OBJECT FORMAT

(75) Inventors: Nardo B. Catahan, Jr., South San Francisco, CA (US); Ying-Chieh Lan, Foster City, CA (US); Roy Chia-Jih Liu, Fremont, CA (US); Joshua Roper, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1374 days.

This patent is subject to a terminal disclaimer.

(21) Appl. No.: 10/688,425

(22) Filed: Oct. 16, 2003

(65) Prior Publication Data

US 2007/0265944 A1    Nov. 15, 2007

Related U.S. Application Data

(60) Provisional application No. 60/451,984, filed on Mar. 4, 2003.

(51) Int. Cl.
*G06Q 40/00* (2012.01)

(52) U.S. Cl.
USPC .............................. 705/37; 705/30

(58) Field of Classification Search
USPC .......................................................... 705/37
See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |
| 5,446,880 A | 8/1995 | Balgeman et al. | 707/9 |

(Continued)

FOREIGN PATENT DOCUMENTS

| | | |
|---|---|---|
| JP | 2001 256308 | 9/2001 |
| WO | WO 0143031 | 6/2001 |
| WO | WO 03/88759 A1 | 11/2001 |

OTHER PUBLICATIONS

XML/EDI Group. "Guidlines for using XML for Electronic Data Interchange." Presented at XML One—San Jose Sep./Oct. 2001. Downloaded from http://web.archive.org/web/20040413182700/http://www.xmledi-group.org/.*

(Continued)

*Primary Examiner* — Paul Danneman
(74) *Attorney, Agent, or Firm* — Campbell Stephenson LLP

(57) ABSTRACT

Embodiments of the invention provide methods and data structures for the effective and efficient synchronization or inter-exchange of invoice information between business applications employing disparate DOFs. For one embodiment, a DOF is provided that allows for relationships between entities, also referred to as invoices, to be modeled as attributes of an entity and for customization of the DOF in a manner that facilitates upgrading of the DOF. For one embodiment, the invoice DOF is provided in a common software language such as XML. For one embodiment, invoice information from each of several business applications is translated to a common DOF. The invoice information, in the common DOF, is then inter-exchanged among the several business applications. Each application has only to translate the invoice information from the common DOF to the application-specific DOF of the respective business application.

23 Claims, 9 Drawing Sheets

U.S. PATENT DOCUMENTS

| | | | | |
|---|---|---|---|---|
| 5,566,332 | A | 10/1996 | Adair et al. | 707/101 |
| 5,646,862 | A | 7/1997 | Jolliffe et al. | 703/1 |
| 5,699,527 | A | 12/1997 | Davidson | 705/38 |
| 5,708,828 | A | 1/1998 | Coleman | 395/785 |
| 5,724,575 | A | 3/1998 | Hoover et al. | 1/1 |
| 5,727,158 | A | 3/1998 | Bouziane et al. | 709/225 |
| 5,742,588 | A | 4/1998 | Thornberg et al. | 370/236 |
| 5,758,355 | A | 5/1998 | Buchanan | 707/201 |
| 5,764,543 | A | 6/1998 | Kennedy | 703/2 |
| 5,806,075 | A | 9/1998 | Jain et al. | 1/1 |
| 5,930,156 | A | 7/1999 | Kennedy | 703/6 |
| 5,930,764 | A | 7/1999 | Melchione et al. | 705/10 |
| 5,953,710 | A | 9/1999 | Fleming | 705/38 |
| 5,970,490 | A | 10/1999 | Morgenstern | 707/10 |
| 5,983,194 | A | 11/1999 | Hogge et al. | 705/7 |
| 6,032,136 | A | 2/2000 | Brake et al. | 705/41 |
| 6,053,947 | A | 4/2000 | Parson | 703/14 |
| 6,167,380 | A | 12/2000 | Kennedy et al. | 705/10 |
| 6,178,418 | B1 | 1/2001 | Singer | 707/3 |
| 6,182,053 | B1 | 1/2001 | Rauber et al. | 705/28 |
| 6,216,130 | B1 | 4/2001 | Hougaard et al. | 707/10 |
| 6,226,649 | B1 | 5/2001 | Bodamer et al. | 707/104.1 |
| 6,233,566 | B1 | 5/2001 | Levine et al. | 705/36 R |
| 6,236,997 | B1 | 5/2001 | Bodamer et al. | 707/10 |
| 6,275,812 | B1 | 8/2001 | Haq et al. | 705/11 |
| 6,336,124 | B1 | 1/2002 | Alam et al. | 715/523 |
| 6,341,289 | B1 | 1/2002 | Burroughs et al. | 707/737 |
| 6,343,275 | B1 | 1/2002 | Wong | 705/26 |
| 6,377,952 | B1 | 4/2002 | Inohara et al. | 707/101 |
| 6,385,620 | B1 | 5/2002 | Kurzius et al. | 707/104.1 |
| 6,434,567 | B1 | 8/2002 | De La Huerga | 707/102 |
| 6,463,430 | B1 | 10/2002 | Brady et al. | 707/3 |
| 6,556,950 | B1 | 4/2003 | Schwenke et al. | 702/183 |
| 6,569,207 | B1 | 5/2003 | Sundaresan | 715/234 |
| 6,591,260 | B1* | 7/2003 | Schwarzhoff et al. | 707/2 |
| 6,631,382 | B1 | 10/2003 | Kouchi et al. | 707/102 |
| 6,668,253 | B1 | 12/2003 | Thompson et al. | 707/10 |
| 6,681,223 | B1 | 1/2004 | Sundaresan | 707/6 |
| 6,738,975 | B1 | 5/2004 | Yee et al. | 719/310 |
| 6,754,679 | B2 | 6/2004 | Oheda | 707/201 |
| 6,778,651 | B1 | 8/2004 | Jost et al. | 379/201.01 |
| 6,792,431 | B2 | 9/2004 | Tamboli et al. | 707/102 |
| 6,826,542 | B1* | 11/2004 | Virgin et al. | 705/34 |
| 6,826,568 | B2 | 11/2004 | Bernstein et al. | 707/749 |
| 6,828,963 | B1 | 12/2004 | Rappoport | 345/419 |
| 6,883,004 | B2* | 4/2005 | Bahl et al. | 707/10 |
| 6,889,260 | B1 | 5/2005 | Hughes | 709/246 |
| 6,898,783 | B1 | 5/2005 | Gupta et al. | 717/105 |
| 6,912,719 | B2 | 6/2005 | Elderon et al. | 719/319 |
| 6,944,514 | B1 | 9/2005 | Matheson | 700/98 |
| 6,947,947 | B2 | 9/2005 | Block et al. | 707/102 |
| 6,961,760 | B2 | 11/2005 | Li et al. | 709/219 |
| 6,996,776 | B1 | 2/2006 | Makely et al. | 715/207 |
| 7,013,485 | B2 | 3/2006 | Brown et al. | 726/27 |
| 7,043,687 | B2* | 5/2006 | Knauss et al. | 715/236 |
| 7,062,540 | B2 | 6/2006 | Reddy et al. | 709/217 |
| 7,065,499 | B1 | 6/2006 | Seth et al. | 705/26 |
| 7,085,729 | B1 | 8/2006 | Kennedy et al. | 705/10 |
| 7,093,200 | B2 | 8/2006 | Schreiber et al. | 715/835 |
| 7,099,350 | B2 | 8/2006 | Peterson | 370/465 |
| 7,111,010 | B2 | 9/2006 | Chen | 1/1 |
| 7,111,077 | B1 | 9/2006 | Starkovich et al. | 709/246 |
| 7,124,112 | B1 | 10/2006 | Guyan et al. | 705/4 |
| 7,133,882 | B1 | 11/2006 | Pringle et al. | 1/1 |
| 7,139,766 | B2 | 11/2006 | Thomson et al. | 1/1 |
| 7,143,100 | B2 | 11/2006 | Carlson et al. | 1/1 |
| 7,162,540 | B2 | 1/2007 | Jasen et al. | 709/242 |
| 7,257,594 | B2 | 8/2007 | Tamboli et al. | 701/101 |
| 7,257,820 | B2 | 8/2007 | Fischer et al. | 719/316 |
| 7,287,041 | B2 | 10/2007 | Barnes-Leon et al. | 707/104.1 |
| 7,337,192 | B2* | 2/2008 | Stark et al. | 707/104.1 |
| 7,349,861 | B1 | 3/2008 | Fischer et al. | 705/7 |
| 7,370,009 | B1 | 5/2008 | Notani et al. | 705/26 |
| 7,412,404 | B1 | 8/2008 | Tenorio | 715/236 |
| 7,680,818 | B1 | 3/2010 | Fan et al. | 707/999.103 |
| 2001/0011245 | A1 | 8/2001 | Duhon | 705/38 |
| 2001/0051907 | A1 | 12/2001 | Kumar et al. | 705/36 R |
| 2002/0007343 | A1 | 1/2002 | Oyama et al. | 705/39 |
| 2002/0019765 | A1 | 2/2002 | Mann et al. | 705/11 |
| 2002/0023004 | A1 | 2/2002 | Hollander et al. | 705/22 |
| 2002/0035431 | A1 | 3/2002 | Ell | 702/5 |
| 2002/0035488 | A1 | 3/2002 | Aquila et al. | 705/4 |
| 2002/0040313 | A1 | 4/2002 | Hunter et al. | 705/9 |
| 2002/0040339 | A1 | 4/2002 | Dhar et al. | 705/38 |
| 2002/0085020 | A1 | 7/2002 | Carroll, Jr. | 345/700 |
| 2002/0095456 | A1 | 7/2002 | Wensheng | 709/203 |
| 2002/0116234 | A1 | 8/2002 | Nagasawa | 705/5 |
| 2002/0123983 | A1 | 9/2002 | Riley et al. | 707/1 |
| 2002/0133510 | A1 | 9/2002 | Lau | 707/203 |
| 2002/0138582 | A1 | 9/2002 | Chandra et al. | 709/206 |
| 2002/0169863 | A1 | 11/2002 | Beckwith et al. | 709/223 |
| 2002/0169867 | A1 | 11/2002 | Mann et al. | 709/224 |
| 2002/0174417 | A1 | 11/2002 | Sijacic et al. | 717/147 |
| 2002/0178077 | A1 | 11/2002 | Katz et al. | 705/26 |
| 2002/0184085 | A1 | 12/2002 | Lindia et al. | 705/11 |
| 2002/0184148 | A1 | 12/2002 | Kahn et al. | 705/40 |
| 2002/0188513 | A1 | 12/2002 | Gil et al. | 705/22 |
| 2002/0188538 | A1 | 12/2002 | Robertson et al. | 705/35 |
| 2003/0014440 | A1 | 1/2003 | Bussert et al. | 715/239 |
| 2003/0018502 | A1 | 1/2003 | Rodriguez | 705/7 |
| 2003/0023580 | A1 | 1/2003 | Braud et al. | 703/3 |
| 2003/0033437 | A1 | 2/2003 | Fischer et al. | 709/310 |
| 2003/0071852 | A1 | 4/2003 | Stimac | 345/810 |
| 2003/0097642 | A1 | 5/2003 | Arai et al. | 716/1 |
| 2003/0110104 | A1 | 6/2003 | King et al. | 705/28 |
| 2003/0131018 | A1 | 7/2003 | Godoy et al. | 707/104.1 |
| 2003/0163597 | A1 | 8/2003 | Hellman et al. | 709/316 |
| 2003/0163603 | A1 | 8/2003 | Fry et al. | 719/328 |
| 2003/0229529 | A1 | 12/2003 | Mui et al. | 705/8 |
| 2004/0002982 | A1 | 1/2004 | Ersek et al. | 1/1 |
| 2004/0015515 | A1 | 1/2004 | Beisiegel et al. | 707/103 Y |
| 2004/0034661 | A1 | 2/2004 | Barron et al. | 1/1 |
| 2004/0039576 | A1 | 2/2004 | He et al. | 705/1 |
| 2004/0093351 | A1 | 5/2004 | Lee et al. | 707/104.1 |
| 2004/0122826 | A1 | 6/2004 | Mackie | 1/1 |
| 2004/0128188 | A1 | 7/2004 | Leither et al. | 705/11 |
| 2004/0162773 | A1 | 8/2004 | Del Rey et al. | 705/36 R |
| 2004/0199536 | A1 | 10/2004 | Barnes-Leon et al. | 705/26 |
| 2004/0215503 | A1 | 10/2004 | Allpress et al. | 705/11 |
| 2004/0249854 | A1 | 12/2004 | Barnes-Leon et al. | 703/103 Y |
| 2005/0021383 | A1 | 1/2005 | Fliess et al. | 705/8 |
| 2005/0021391 | A1 | 1/2005 | Lu et al. | 705/11 |
| 2005/0091249 | A1 | 4/2005 | Hanson et al. | 707/101 |
| 2005/0160361 | A1 | 7/2005 | Young | 715/513 |
| 2005/0197880 | A1 | 9/2005 | Walsh et al. | 705/8 |
| 2006/0271446 | A1 | 11/2006 | Barnes-Leon et al. | 705/26 |
| 2007/0033531 | A1 | 2/2007 | Marsh | 715/738 |
| 2007/0203710 | A1 | 8/2007 | Habichler et al. | 705/1 |
| 2007/0208577 | A1 | 9/2007 | Barnes-Leon et al. | 705/1 |
| 2007/0208878 | A1 | 9/2007 | Barnes-Leon et al. | 709/246 |
| 2007/0214020 | A1 | 9/2007 | Srinivasan et al. | 705/4 |
| 2007/0214063 | A1 | 9/2007 | Kahlon et al. | 705/28 |
| 2007/0214064 | A1 | 9/2007 | Kahlon et al. | 705/28 |
| 2007/0214065 | A1 | 9/2007 | Kahlon et al. | 705/28 |
| 2007/0225949 | A1 | 9/2007 | Sundararajan et al. | 703/2 |
| 2007/0226037 | A1 | 9/2007 | Garg et al. | 705/10 |
| 2007/0226049 | A1 | 9/2007 | Muralitharan et al. | 705/11 |
| 2007/0226093 | A1 | 9/2007 | Chan et al. | 705/35 |
| 2007/0250408 | A1 | 10/2007 | Leon et al. | 705/28 |
| 2007/0250419 | A1 | 10/2007 | Kumar et al. | 705/34 |

OTHER PUBLICATIONS

NPL_XML_Schema_CE, XML 1.0 Standard, 2003. Downloaded on Aug. 31, 2009 from http://www.w3schools.com/Schema/schema_intro.asp?output=print, 2 pages, http://www.w3schools.com/Schema/schema_complex.asp?output=print, 3 pages, and http://www.w3schools.com/Schema/schema_complex_empty.asp?output=print, 2 pages.*

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

Hardwick, Martin, David L. Spooner, Rom Rando, and K.C. Morris, "Sharing Manufacturing Information in Virtual Entetprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage entriched ifnormation across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

"Extract simplifies file conversion" Software Markets, Dec. 2, 1991. Retrieved via Dialog on Aug. 16, 2010.

"Fortis Investments Implements Unified Employee Management System Across 12 Countries" (Business Wire, Jul. 2004).

Cover Pages "Siebel's Universal Application Network" Apr. 8, 2002 downloaded from xml.coverpages.org May 6, 2010.

Cover Pages "Siebel Announces Success with Universal Application Network (UAN)" Apr. 21, 2004 downloaded from xml.coverpages.org May 6, 2010.

Michael Kay, Editor "XSL Transformations (XSLT) Version 2.0 W3C Working Draft 2 May 2003" downloaded from http://www.w3.org/TR/2003/WD-xslt20-20030502/ May 6, 2010.

Eric Gropp "Transforming XML Schemas" Jan. 15, 2003, downloaded from xml.com May 6, 2010.

Sonic Software Corporation, Power Schemas With Stylus Studio™ Jan. 2004.

Walter J. Savitch, Java an Introduction to Computer Science & Programming, 2000, p. 478.

Routledge et al., UML and XML Schema, 2002, pp. 1-10.

Walter J. Savitch, Java an Introduction to Computer Science & Programming, 2000, pp. 458-467.

Walter J. Savitch, Java an Introduction to Computer Science & Programming, 2000, p. 1.

NPL__XML__Schema__CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3.schools.com/Schema/schema_complex_empty.asp?;7 pages.

Ohlhorst, Frank J., "ScanSoft's OmniForm Fills Bill for Forms-Driven Customers," CRN; Jericho: Feb. 17, 2003, Issue 1033; p. 51 (I page).

Seminerio, Maria, "Job Agencies Will Hire HR-XML—Protocol Promises a Lingua Franca for Resumes;" eWeek; Jan. 1, 2001; vol. 18, Issue I; p. 45.

Anonymous; CambridgeDocs Releases xDoc SML Converter; Information Today; Mar. 1, 2001; vol. 20, Issue 3; p. 49.

Anonymous; "HR-XML Consortium Sponsors Panel Discussion/Demonstrates Draft Protocol at IHRIM Conference and Expo;" Business Wire; Jun. 28, 2000; 4 pages.

* cited by examiner

Organization

Invoice Type: e.g. Invoice, Credit Memo ....

Invoice Plan: e.g. 1st of the month for 24 month:

Terms of Payment

INVOICE DATA OBJECT FOR A COMMON DATA OBJECT FORMAT

CLAIM OF PRIORITY

This application is related to, and hereby claims the benefit of provisional application No. 60/451,984 which was filed Mar. 4, 2003.

FIELD

Embodiments of the invention relate generally to computer software application, and more specifically to common data object formats for such applications.

BACKGROUND

Various business entities, such as companies, store information electronically in furtherance of their business needs. These companies may have extensive databases of information that include customer tables, supplier tables, employee tables, and so on. The structure of the database system (schemas) and the data object format (DOF) of each database may be customized to help meet the business needs of the company. For example, an automotive manufacturer may organize information about its customers in a way that is very different from the way that an online bookstore may organize information about its customers. Even within a single company, that company may use many different application programs that employ very different schemas and DOFs. For example, a customer relationship management application program may use a DOF that is very different from the DOF used by an accounting program. The use of customized DOFs by a company and by applications within the company has the advantage that it allows information to be modeled in a way that is appropriate for the business needs of the company. Unfortunately, because of this diversity in the DOFs, it is not easy for the company to share its information with other companies or for applications to share their information.

The inter-exchange of information between applications of different business entities or even between different applications of the same business entity can be problematic due to the variation in DOFs between applications.

For example, a business entity may use a proprietary billing system. If the business entity decides to integrate a number of related applications from each of several software vendors, a translation mechanism may have to be created and implemented between the underlying billing system and each related application. This is because each application from a different software vendor may have a unique, or substantially different, DOF. Moreover, fill integration of the multiple applications may require creation and implementation of a translation mechanism between each of the related applications as well.

A change in the underlying billing system may necessitate recreating and implementing such translation mechanisms.

Various attempts have been made to define standard data models so that information can be more easily shared between companies and applications. For example, the Open Applications Group has designed a standard data model that can be used by companies and applications when sharing information. A problem with such data models is that they did not provide effective ways to model relationships between various parties, such as a person or a company. In addition, if a company or an application developer wants to customize the standard data model, the customized data model may not be compatible with future upgrades of the standard data model.

It would be desirable to have a data model that would more effectively model relationships and facilitate the upgrading of customizations of the data model.

DETAILED DESCRIPTION

Overview

Embodiments of the invention provide methods and data structures for the effective and efficient synchronization or inter-exchange of invoice information between business applications employing disparate DOFs. For one embodiment, a DOF is provided that allows for relationships between entities, also referred to as invoices, to be modeled as attributes of an entity and for customization of the DOF in a manner that facilitates upgrading of the DOF. For one embodiment, the invoice DOF is provided in a common software language (i.e., software specification). In one embodiment, the common DOF defines an invoice class that includes multiple data types and the relationships between the data types of the invoice class. The relationships may include basic elements of invoice DOFs from various business applications.

For one embodiment, a method is provided for efficient synchronization or inter-exchange of invoice information between business applications using different invoice DOFs. For such an embodiment, invoice information from each of several business applications is translated to a common DOF. The invoice information, in the common DOF, is then inter-exchanged among the several business applications. Each application has only to translate the invoice information from the common DOF to the application-specific DOF of the respective business application.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

Figure 1:
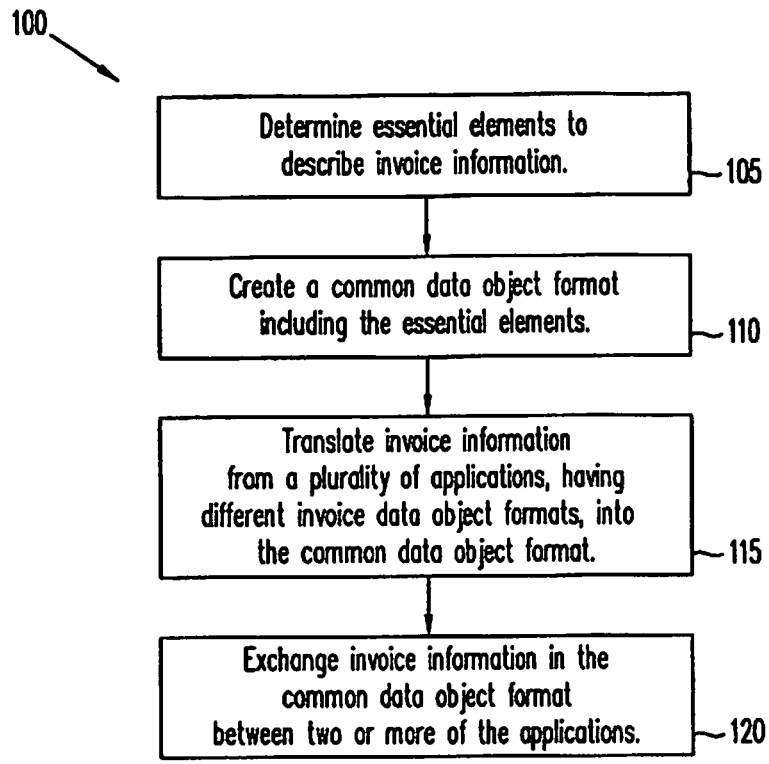
FIG. 1 illustrates a process by which a common DOF for invoice information is implemented to effect the inter-exchange of invoice information between business applications employing disparate DOFs for invoice information in accordance with one embodiment of the invention.

FIG. 1 illustrates a process by which a common DOF for invoice information is implemented to effect the inter-exchange of invoice information between business applications employing disparate DOFs for invoice information in accordance with one embodiment of the invention. Process 100, shown in FIG. 1, begins at operation 105 in which a base set of essential elements to describe invoice information is determined. For example, for one embodiment the essential elements may be determined to include a common identification object, invoice base data, pricing data, shipping data, and list of invoice line item details consisting of all the detail information of an invoice. For one embodiment, base data contains the base information of an invoice, which is fundamental data sufficient to identify the invoice. Base data may contain the invoice identification information and other fundamental data.

For one embodiment, essential elements may be determined so as to achieve a specified level of compatibility with the DOFs of various extant business applications.

At operation 110 a common DOF for the invoice information is created. For one embodiment, the common DOF includes the determined essential elements. For various alternative embodiments, the common DOF may include some or all of the determined essential elements as well as other elements. The common DOF is created in a common format that may be selected based upon the extent to which the format is interoperable with various business applications. For one embodiment, the common DOF is created in extensible markup language (XML) format that allows application designers to create customized tags that enable the transmission, validation, and interpretation of data between applications.

At operation 115 the invoice information from a plurality of business applications having different invoice DOFs is translated into the common DOF. That is, for each application, the invoice information in an application-specific DOF is translated into the common DOF.

At operation 120 the invoice information in the common DOF is exchanged between two or more of the business applications. At this point a business integration server completes the translation of the invoice information in the common DOF to the application-specific DOF for each respective business application as described below.

System

Figure 2:
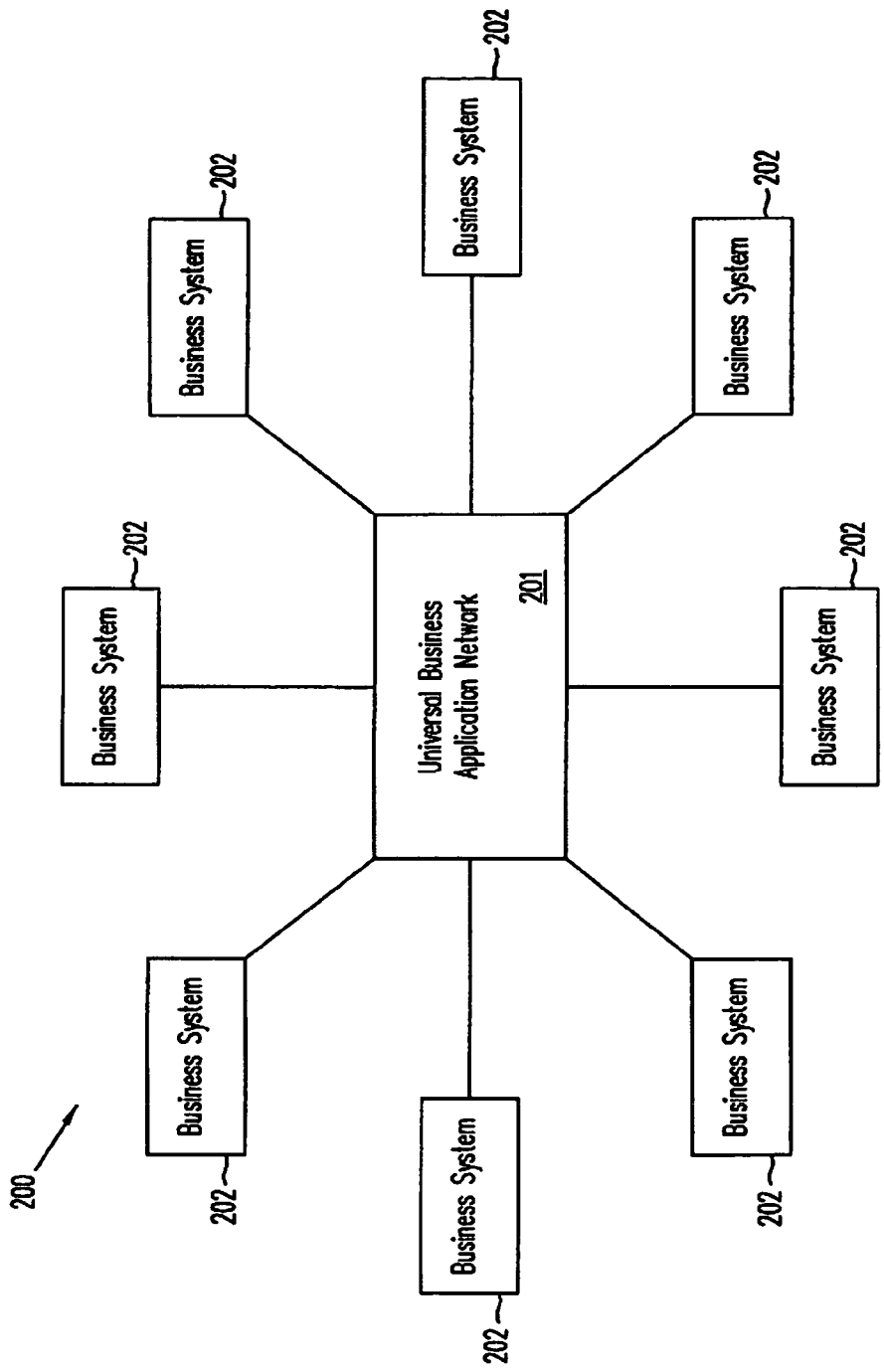
FIG. 2 illustrates the interconnection between a plurality of various business system applications and a universal business application network to effect the inter-exchange of invoice information between the business applications in accordance with one embodiment of the invention.

FIG. 2 illustrates the interconnection between a plurality of various business system applications and a universal business application network to effect the inter-exchange of invoice information between the business applications in accordance with one embodiment of the invention. System 200, shown in FIG. 2, includes a number of business systems 202, each having an application using an application-specific DOF for invoice information. The business systems are coupled through a universal business application network 201 that serves as an integration hub for the business systems.

In accordance with one embodiment of the invention, each of the business systems implements a translation mechanism to translate invoice information, in an application-specific DOF, into a common DOF. The invoice information in the common DOF may then be inter-exchanged between the business systems through the universal business application network. A business integration server then translates the invoice information from the common DOF into a particular application-specific DOF for a respective business system as described more fully below in reference to FIG. 3.

The architecture of the universal business application network allows new business applications that access legacy business systems to be developed with minimum customization. The legacy business systems can be provided by a single business organization or by different business organizations. The universal business application network also allows the business applications to exchange invoice information using an invoice common DOF. In one embodiment, the universal business application network uses the XML and Web services standards.

Figure 3:
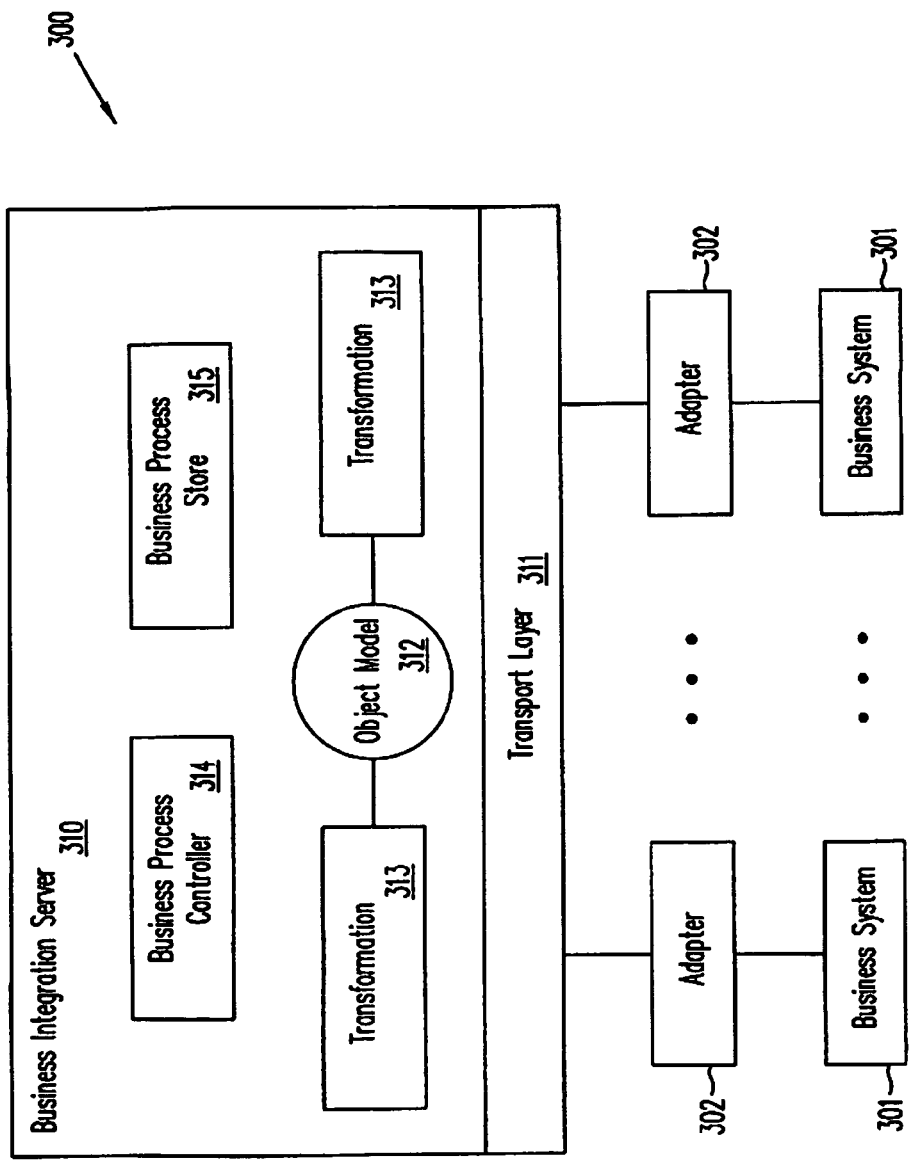
FIG. 3 illustrates an exemplary architecture for a universal business application network in accordance with one embodiment of the invention.

FIG. 3 illustrates an exemplary architecture for a universal business application network in accordance with one embodiment of the invention. The hub of the universal business application network 300 is the business integration server 310 that connects to the various business systems 301 via adapters 302. The business integration server includes a transport layer 311, an object model 312, a transformation store 313, a business process controller 314, and a business process store 315. The transport layer 311 is a mechanism through which business information is exchanged between the business systems 301 and the business integration server 310. Each business system 301 may have an adapter 302 that is appropriate to the protocol of the transport layer 311. For example, the transport mechanism may use communications protocols such as TCP/IP. The transport layer may provide a messaging service for queuing, for guaranteeing delivery of messages, and for handling both synchronous and asynchronous messaging. The adapters 302 relay events from the business systems 301 to the business integration server 310 and can import configurations of the business systems 301 into the business integration server 310. In addition, the universal business application network 300 may include encryption and authentication mechanisms to ensure the security and integrity of the information. For example, authentication will help ensure that a business process is accessing the intended business system, rather than an impostor business system.

As discussed above, the common DOF may include the definition of various invoice-related objects. The objects may be defined using standard object definition tools such as an XML schema definition tool. The transformation store contains transformations for translating information received from the business systems to the common DOF, and vice versa. For example, an invoice object may include a globally unique identifier for each person. A transformation for a business system that does not use globally unique identifiers may need to access an identification server to determine the globally unique identifier for each invoice. The transformations may be specified as a computer program, an XML Stylesheet Language Transform ("XSL T"), etc. The business process store contains the business processes that have been defined. A business process may be specified as a script, a process flow, an executable program, etc. In one embodiment, the business processes are defined using the Web Services Flow Language ("WSFL"). The business processes orchestrate a sequence of steps across multiple applications provided by the business systems to achieve a business objective. The business process controller coordinates the execution of the business processes. The business process controller may instantiate objects and invoke functions of the objects in accordance with the various business processes. The business process controller may also initiate the execution of business processes based on predefined conditions and events. For example, the business process controller may launch a certain business process each time an alert is received. Although not shown, the business integration network may provide a standard library of business routines that may be invoked by the business processes. For example, a standard business routine might be to identify whether two invoice objects represent the same individual or to apply business rules to various objects and take the appropriate action as defined by those rules. The business integration server may also include various tools to facilitate the development of business processes. These tools may aid in the development of transformations, the defining of common objects, and the writing of process flows.

Data Structure

The common DOF may include basic elements of invoice DOFs from various business applications. For example, the common DOF may include a common identification object, invoice base data, pricing data, shipping data, and list of invoice line item details among its base element set. Additionally, for alternative embodiments, the common DOF may include such elements as related business unit, list of related parties, related invoice type, related invoice plan, related inventory location, related price list, related payment terms, list of payment methods, list of payments, and list of comments.

In one embodiment, the common DOF defines a hierarchy of the data elements for describing an invoice. The common DOF may define data elements that are complex. A complex data element is a data element that comprises data sub-elements. For example, a payment method element may be a complex data element that includes card payment, cash payment, and finance account payment data sub-elements.

FIGS. 4A-4G illustrate an exemplary data structure for a common DOF in accordance with one embodiment of the invention. One skilled in the art will appreciate that the name of each data element is descriptive of the information stored in the data element.

Figure 4A:
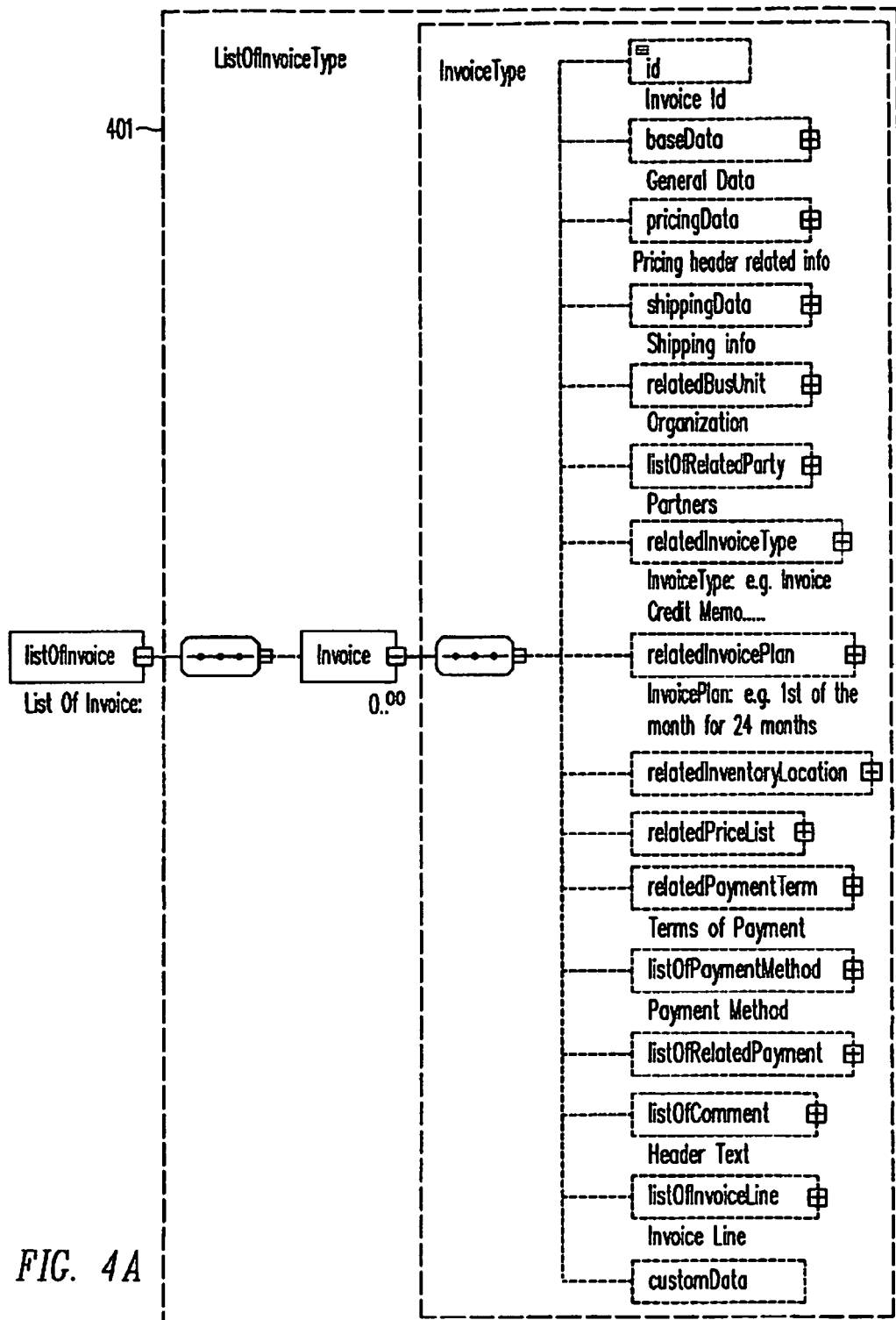
FIGS. 4A-4G illustrate an exemplary data structure for a common DOF in accordance with one embodiment of the invention.

FIG. 4A illustrates the highest level data elements 401 of the invoice class in accordance with one embodiment. The highest level data elements include id, baseData, pricingdata, shippingdata, relatedBusUnit, listOfRelatedParty, relatedInvoiceType, relatedInvoicePlan, relatedInventoryLocation, relatedPriceList, relatedPaymentTerm, listofPaymentMethod, listOfRelatedPayment, listOfComment, listOfInvoiceLine, and customData data elements.

The id data element may be a unique identifier of a party. The customData data element initially contains no data elements, but custom data elements can be added by defining data elements in the CustomDataType as described below.

Figure 4B:
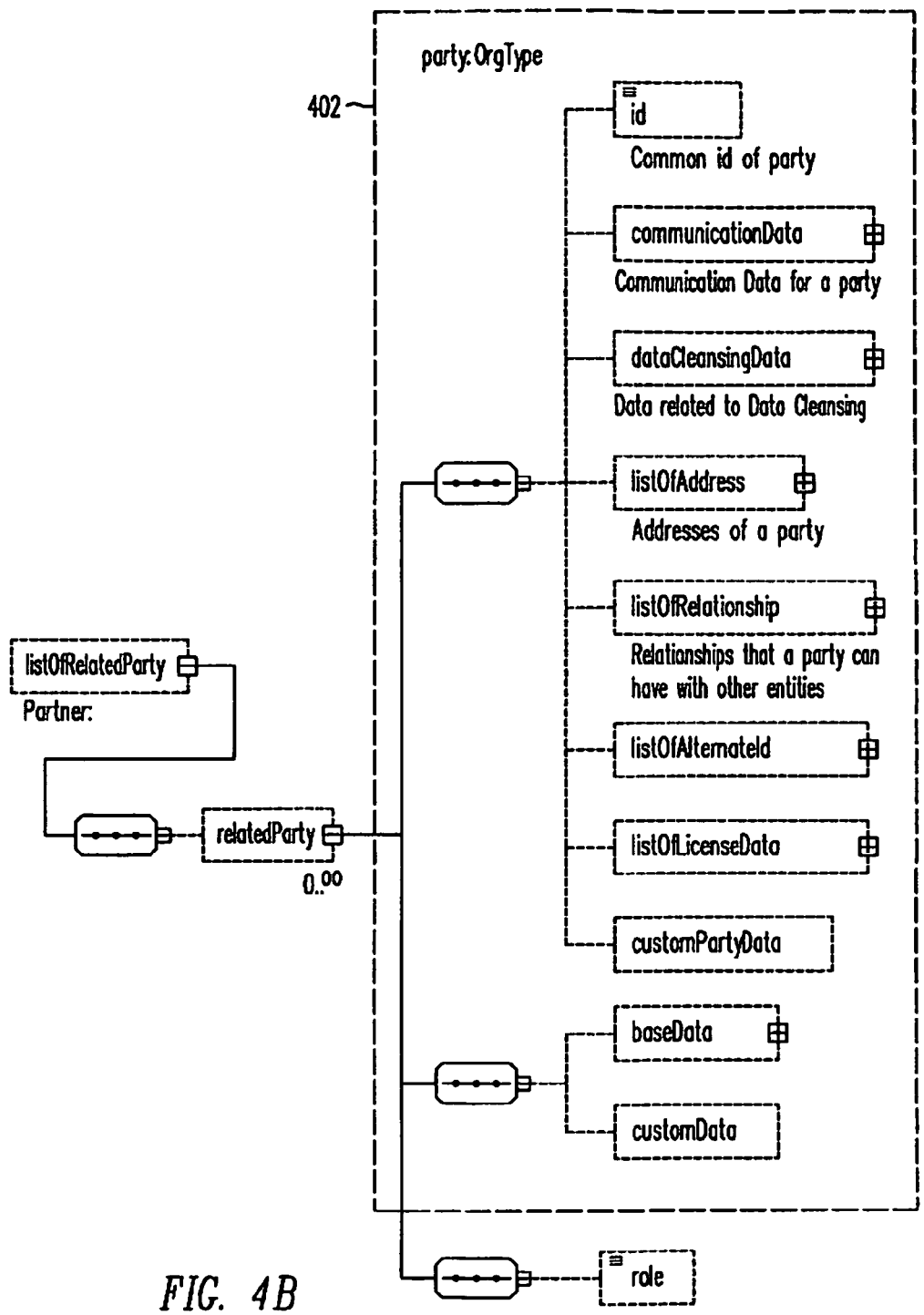

FIG. 4B illustrates the data elements of the Related Party class 402 in accordance with one embodiment. The Related Party class represents the related party information. The Related Party class includes id, communicationData, dataCleansingData, listOfAddress, listOfRelationship, listOfAlternateId, listOfLicenseData, customPartyData, baseData, and customData. The Related Party class also includes a customData data element with a type of CustomDataType that initially is defined to have no data elements.

Figure 4C:
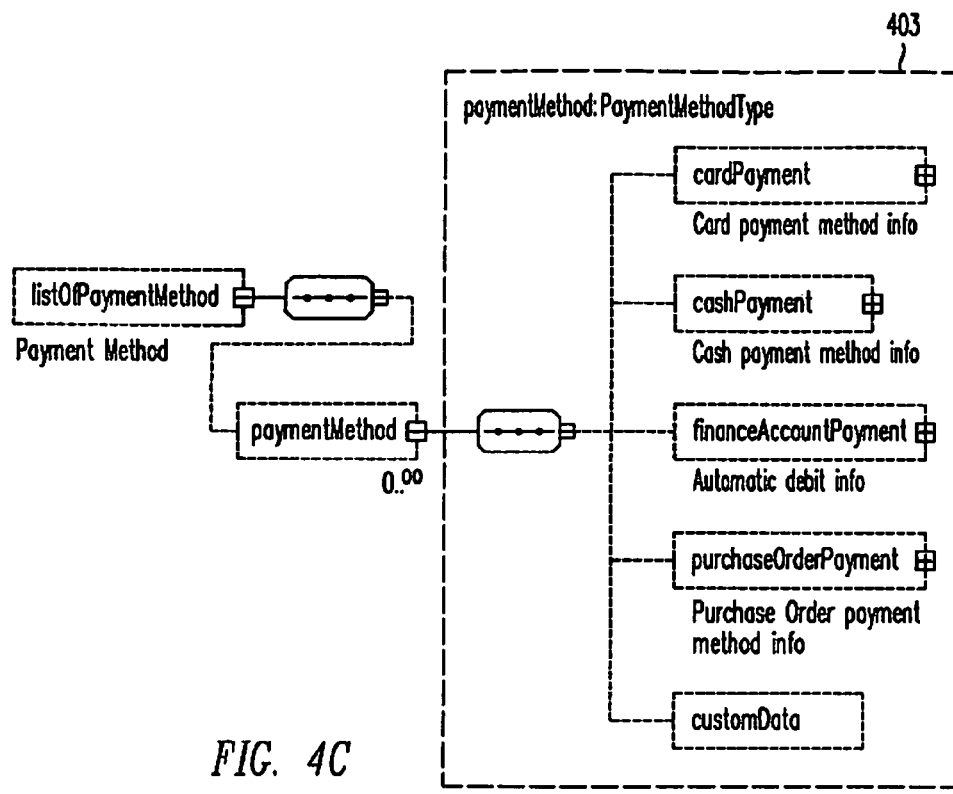

FIG. 4C illustrates the data elements of the Payment Method class 403 in accordance with one embodiment. The Payment Method class includes cardPayment, cashPayment, financeAccountPayment, purchaseOrderPayment and customData data elements.

Figure 4E:
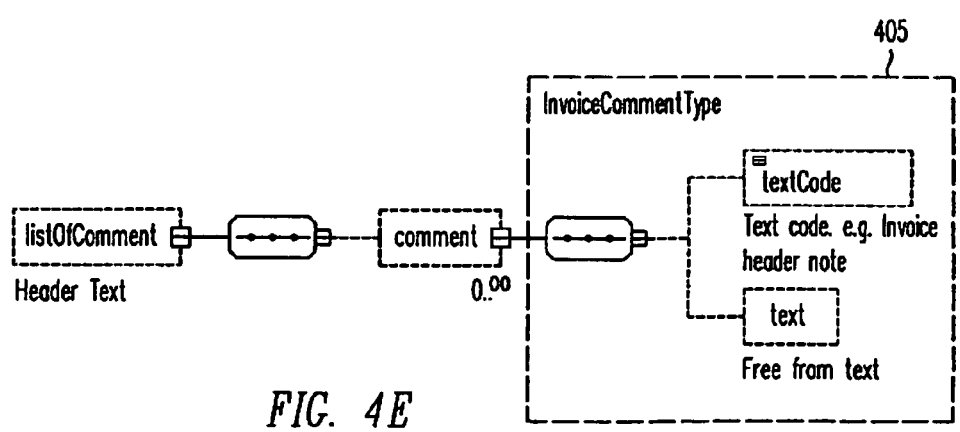
Figure 4D:
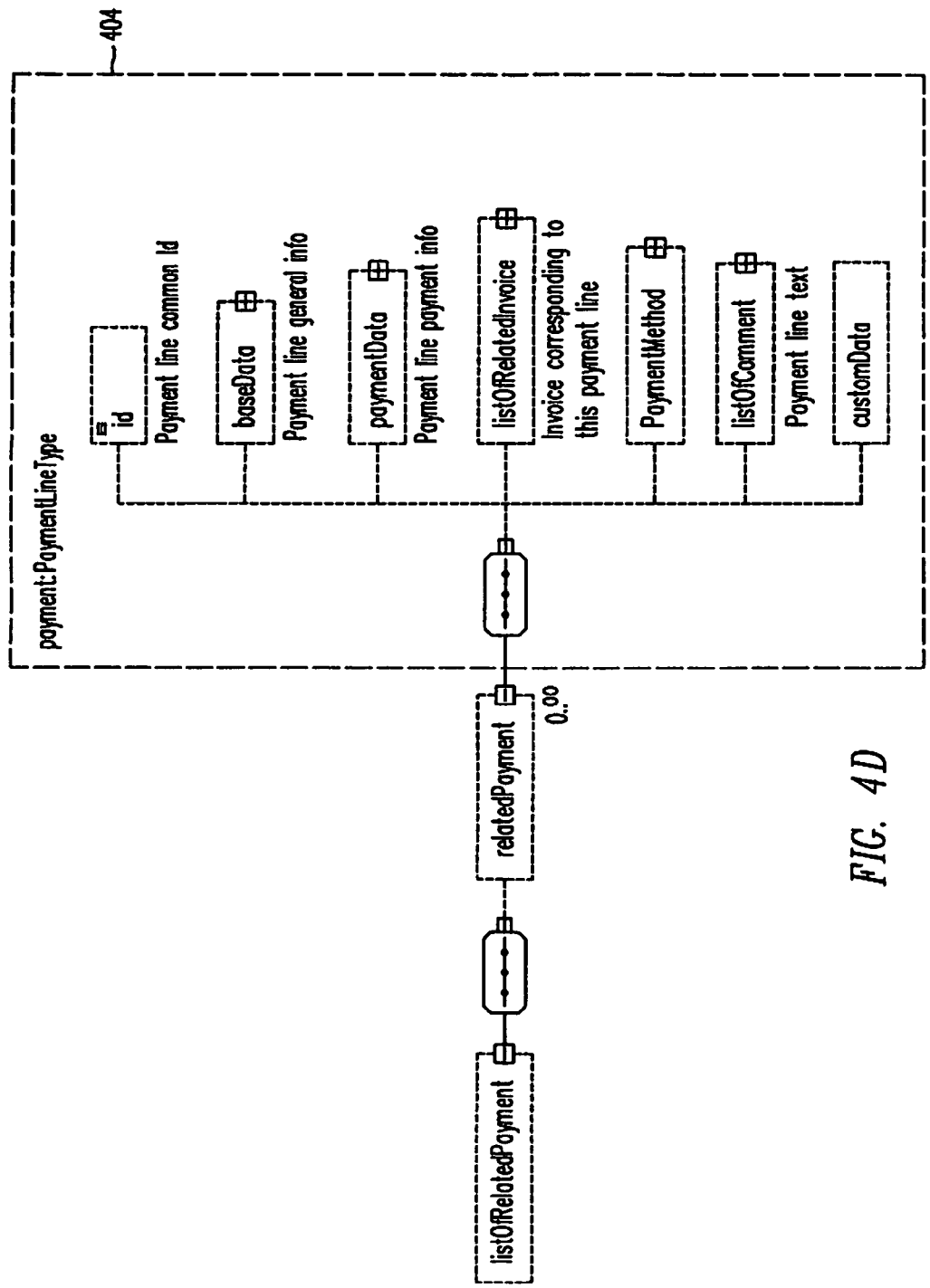

FIG. 4D illustrates the data elements of the Related Payment class 404 in accordance with one embodiment. The Related Payment class includes id, baseData, paymentData, listOfRelatedInvoice, PaymentMethod, listOfComment, and customData data elements.

FIG. 4E illustrates the data elements of the Comment class 405 in one embodiment. The Comment class includes textCode and text data elements.

Figure 4G:
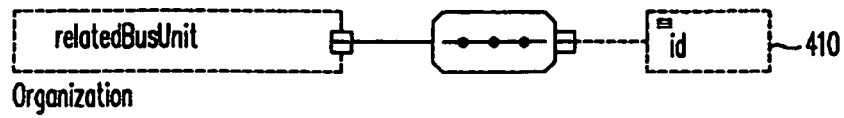
Figure 4G:
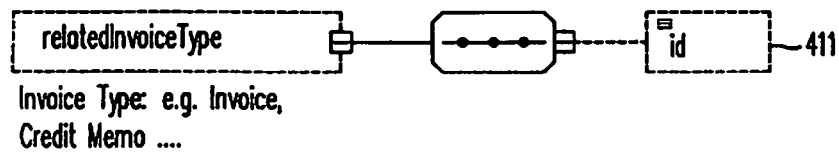
Figure 4G:
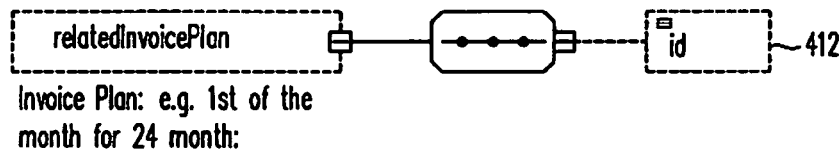
Figure 4G:
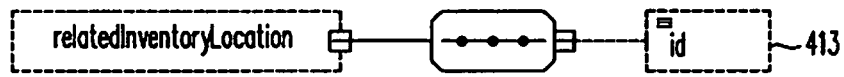
Figure 4G:
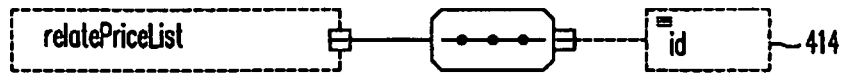
Figure 4G:
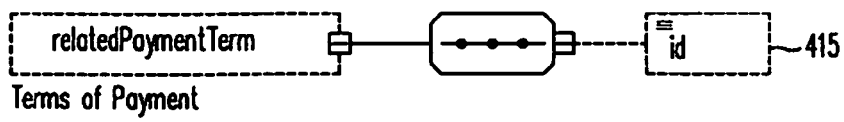
Figure 4F:
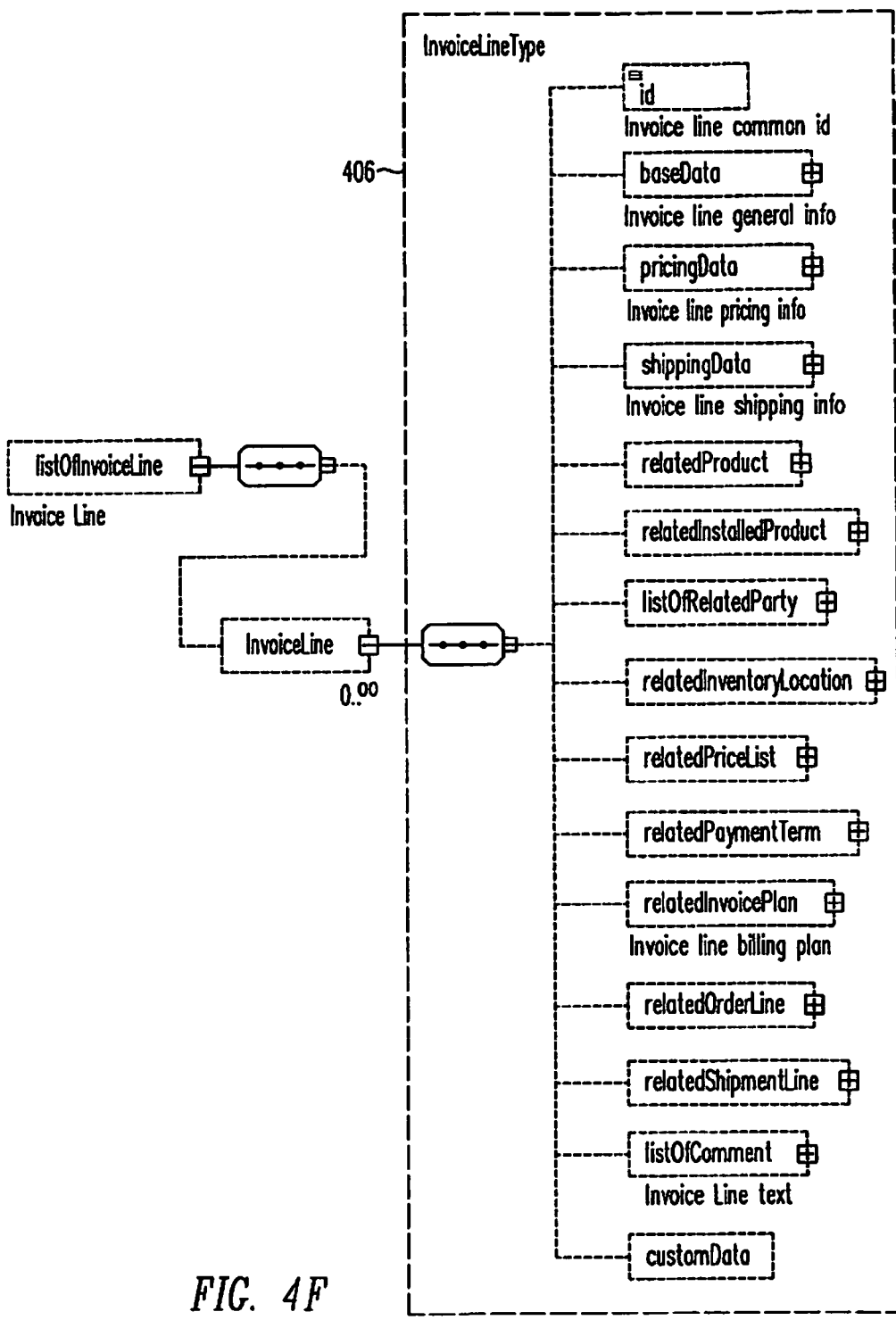

FIG. 4F illustrates the data elements of the Invoice Line class 406 in accordance with one embodiment. The Invoice Line represents the related invoice line item detail information for an invoice. The Invoice Line class includes id, baseData, pricingData, shippingdata, relatedProduct, relatedInstalledProduct, listOfRelatedParty, relatedInventoryLocation, relatedPriceList, relatedPaymentTerm, relatedInvoicePlan, relatedOrderLine, relatedShipmentLine, listOfComment, and customData data elements.

FIG. 4G illustrates data elements for various information related to the invoice information in accordance with one embodiment of the invention. The related business unit class 410 represents the related organization information. The related invoice type class 411 represents the related invoice type information for the respective invoice, such as invoice, credit memo, etc. The related invoice plan class 412 represents the related invoice plan information for the respective invoice, such as $1^{st}$ of the month for 24 months, yearly on January $1^{st}$, etc. The related inventory location class 413 represents related inventory location. The related price list class 414 represents related price lists. The related payment term class 415 represents related payment terms.

Embodiments of the invention provide a common DOF for invoice information that can be used as an intermediate DOF during translation of invoice information from one application-specific DOF to another.

For one embodiment, the common DOF may contain a custom data element at various places within the hierarchy of data elements that allow a customer to put in more attributes. A custom data element is of a custom data element type. The custom data element type initially defines no data elements. The data model can be customized by defining custom data elements for the custom data element type. For example, the data elements relating to the relationship of an invoice may have a custom data element through which data elements relating to the history of previously related invoices can be defined. Because the custom data elements are defined at various places within the hierarchy, the customizations of the data model can be associated with related data elements within the hierarchy.

In one embodiment, each of the types of an invoice specifies a custom data element for that type. For example, the related party data element may be defined as the related party data type. If so, the data type can be customized by adding data elements to the definition of the related party data type. The definition may be stored in a file that is separate from the file in which the data type is defined. A portion of an XML schema that defines the custom data a related party is

```
<xs:element name="customData" type=
"custom:Related Party Data Type" minOccurs = "0" />
``` where "custom" specifies a file that contains the definition of Related Party Data Type, which may be

```
<xs:complexType name=Related PartyDataType">
<xs:annotation
<xs:documentation>
Define the custom data element for this type following this annotation
<xs:documentation>
</xs:annotation>
</xs:complexType>
```

Figure 5:
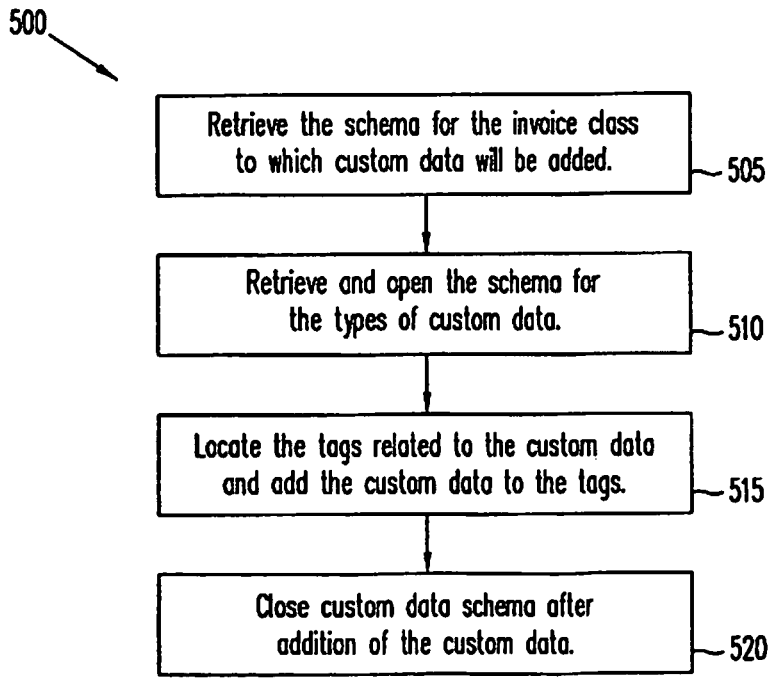
FIG. 5 illustrates a process by which custom data is added to an invoice class in accordance with one embodiment of the invention.

FIG. 5 illustrates a process by which custom data is added to an invoice class in accordance with one embodiment of the invention. Process 500, shown in FIG. 5, begins at operation 505 in which the schema for the invoice class is retrieved. The schema may be an XML schema file that includes a custom data element of a type that is defined in another file.

At operation 510 the schema for the types of custom data is retrieved and opened. The schema may be stored in an XML schema file that contains the definition for each type of custom data.

At operation 515 the tags relating to the custom data type of interest are located and the custom data elements are added to the tags.

At operation 520, the custom data schema with the newly defined data elements added to the custom data type is closed.

Embodiments of the invention include various operations. Many of the methods are described in their most basic form, but operations can be added to or deleted from any of the methods without departing from the basic scope of the invention.

It will be apparent to those skilled in the art that the data structure and operations of embodiments of the invention may be stored upon or embodied in machine-executable instructions, which may be used to cause a general-purpose or special-purpose processor or logic circuits programmed with the instructions to perform specific operations.

Alternatively, the operations of embodiments of the invention may be performed by a combination of hardware and software. Embodiments of the present invention may be provided as a computer program product that may include a machine-readable medium having stored thereon instructions, which may be used to program a computer (or other electronic devices) to perform a process according to various embodiments of the invention present may be provided as a computer program product that may include a machine-readable medium having stored thereon instructions, which may be used to program a computer (or other electronic devices) to perform a process according to various embodiments of the invention. Likewise, embodiments of the invention present may be provided as data structures stored upon a machine-readable medium. Such machine-readable medium may include, but are not limited to, floppy diskettes, optical disks, CD-ROMs, and magneto-optical disks, ROMs, RAMS, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

The computers (e.g., universal business application network computer and business systems computer) may include a central processing unit, memory, input devices (e.g., keyboard and pointing devices), output devices (e.g., display devices), and storage devices (e.g., disk drives) The memory and storage devices may be computer-readable media that may contain instructions that implement the security system. In addition, the data structures and message structures may be stored or transmitted via a data transmission medium, such as a signal on a communications link.

From the foregoing, it will be appreciated that although specific embodiment of technology have been described herein for purposes of illustration, various modifications may be made without deviating from the spirit and scope of the invention. For example, the class definitions that have been described using XML schema can be equivalently described using other class definition tools such as a C class. The classes described can be instantiated in memory and be initialized with information. Therefore, while the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving invoice information from each of a plurality of applications, wherein
the invoice information from the each of the plurality of applications is received in an application-specific data object format of the each of the plurality of applications;
translating the invoice information into a common invoice data object format, wherein
the translating is performed by a processor,
the common invoice data object format comprises
at least one relationship data element, and
at least one custom data element,
the relationship data element specifies at least one relationship between a plurality of entities, and
the at least one custom data element facilitates customization of the common invoice data object format;
determining essential data elements of the common invoice data object format, wherein
the essential data elements are stored in a memory coupled to the processor,
the essential data elements comprise
an identification data element,
a base data element,
a pricing data element,
a shipping data element, and
a line item details data element, and
the determining comprises
invoking a business routine, wherein
the business routine is one of a standard library of business routines stored by an integration server,
the business routine is invoked by a business process,
the business process is used to define the common data object format,
the common data object format comprises a plurality of invoice objects, and
an invoice object of the plurality of invoice objects comprises a globally unique identifier; and
translating the invoice information in the common invoice data object to another application-specific data object format, wherein
the another application-specific data object format is used by a respective application.

2. The method of claim 1, further comprising:
inter-exchanging invoice information in the common invoice data object format between two or more of the plurality of applications.

3. The method of claim 1, wherein
the common invoice data object format uses an extensible markup language format.

4. The method of claim 3, further comprising:
creating a common invoice data object format comprising at least one of the essential data elements.

5. The method of claim 1, wherein
the essential data elements are determined based upon elements of a plurality of application-specific data object formats.

6. The method of claim 5, further comprising:
specifying a level of compatibility with a data object format of a first application, wherein
the determining the essential data elements facilitates achieving the specified level of compatibility.

7. The method of claim 5, wherein
the common invoice data object format comprises at least one complex data element.

8. The method of claim 7, wherein
the common invoice data object format comprises one or more related data elements, and
the one or more related data elements comprise at least one of
a related party data element,
a related payment method data element,
a related payment terms data element, or
a related comments data element.

9. An integration server comprising:
a processor;
a machine-readable storage medium configured to be accessed by the processor; and
a data structure, wherein
the data structure is stored on the machine-readable storage medium,
the data structure is defined by a common invoice data object format,
the data structure comprises
at least one relationship data element, wherein
the relationship data element specifies at least one relationship between a plurality of entities
at least one custom data element, wherein
the at least one custom data element is configured to facilitate customization of the common invoice data object format,
an invoice identification data element
an invoice base data element
an invoice pricing data element
an invoice shipping data element, and
an invoice line item details data element,
the common invoice data object format is defined, at least in part, by invoking a business routine, wherein
the business routine is one of a standard library of business routines stored at the integration server,
the business routine is configured to be invoked by a business process,
the business process is used to define the common data object format,
the common data object format comprises
a plurality of invoice objects, and
an invoice object of the plurality of invoice objects comprises
a globally unique identifier, the data structure is configured to be used in translating invoice information into a common invoice data object format, and
the data structure is further configured to be used in translating the invoice information in the common invoice data object format to an application-specific data object format, wherein
the application-specific data object format is used by a respective application.

10. The integration server of claim 9, wherein the data structure further comprises:
at least one complex data element.

11. The integration server of claim 10, wherein the data structure further comprises:
one or more related data elements selected from the group consisting of a related party data element, a related payment method data element, a related payment terms data element, and a related comments data element.

12. A non-transitory tangible machine-readable medium that provides executable instructions, which, when executed by a computing system, cause the computing system to perform a method comprising:
receiving invoice information from each of a plurality of applications, wherein
the invoice information from the each of the plurality of applications is received in an application-specific data object format of the each of the plurality of applications;
translating the invoice information into a common invoice data object format, wherein
the common invoice data object format comprises
at least one relationship data element, and
at least one custom data element,
the relationship data element specifies at least one relationship between a plurality of entities, and
the at least one custom data element facilitates customization of the common invoice data object format;
determining essential data elements of the common invoice data object format, wherein
the essential data elements comprise
an identification data element,
a base data element,
a pricing data element,
a shipping data element, and
a line item details data element, and
the determining comprises
invoking a business routine, wherein
the business routine is one of a standard library of business routines stored by an integration server,
the business routine is invoked by a business process,
the business process is used to define the common data object format,
the common data object format comprises
a plurality of invoice objects, and
an invoice object of the plurality of invoice objects comprises
a globally unique identifier; and
translating the invoice information in the common invoice data object to another application-specific data object format, wherein
the another application-specific data object format is used by a respective application.

13. The non-transitory tangible machine-readable medium of claim 12, wherein the method further comprises:
   inter-exchanging invoice information in the common invoice data object format between two or more of the plurality of applications.

14. The non-transitory tangible machine-readable medium of claim 13, wherein the common invoice data object format uses an extensible markup language format.

15. The non-transitory tangible machine-readable medium of claim 14, wherein the method further comprises:
   creating a common invoice data object format comprising at least the essential data elements.

16. The non-transitory tangible machine-readable medium of claim 12 wherein
   the essential data elements are determined based upon elements of a plurality of application-specific data object formats.

17. The non-transitory tangible machine-readable medium of claim 16, wherein
   the common invoice data object format comprises at least one complex data element.

18. The non-transitory tangible machine-readable medium of claim 17, wherein
   the common invoice data object format comprises one or more related data elements, and
   the one or more related data elements comprise at least one of
      a related party data element,
      a related payment method data element,
      a related payment terms data element, or
      a related comments data element.

19. A system comprising:
   a plurality of processing systems, each processing system storing at least one application that processes invoice information, the invoice information having an application-specific data object format; and
   an integration server, coupled via a network, to each of the plurality of processing systems, wherein
      the integration server is configured to translate invoice information from an application specific data object format to a common invoice data object format, wherein
         the common invoice data object format comprises
            at least one relationship data element, wherein
               the relationship data element specifies at least one relationship between a plurality of entities,
            at least one custom data element, wherein
               the custom data element facilitates customization of the common invoice data object format, and
            a set of essential data elements,
         the set of essential data elements are determined based upon elements of a plurality of application-specific data object formats, and
         the set of essential data elements comprise
            an identification data element,
            a base data element,
            a pricing data element,
            a shipping data element, and
            a line item details data element,
      the integration server is further configured to
         determine the set of essential data elements by virtue of being configured to
            invoke a business routine, wherein
               the business routine is one of a standard library of business routines stored at the integration server,
               the business routine is configured to be invoked by a business process,
               the business process is used to define the common data object format,
               the common data object format comprises a plurality of invoice objects, and
               an invoice object of the plurality of invoice objects comprises
                  a globally unique identifier, and
         translate the invoice information in the common invoice data object to an application-specific data object format, wherein
            the application-specific data object format is configured to be used by a respective application.

20. The system of claim 19, wherein invoice information in the common invoice data object format is inter-exchanged between two or more processing systems.

21. The system of claim 20, wherein the common invoice data object format uses an extensible markup language format.

22. The system of claim 21, wherein the common invoice data object format includes at least one complex data element.

23. The system of claim 22, wherein the common invoice data object format includes one or more related data elements selected from the group consisting of a related party data element, a related payment method data element, a related payment terms data element, and a related comments data element.

* * * * *

UNITED STATES PATENT AND TRADEMARK OFFICE
CERTIFICATE OF CORRECTION

PATENT NO. : 8,473,399 B2
APPLICATION NO. : 10/688425
DATED : June 25, 2013
INVENTOR(S) : Catahan, Jr. et al.

It is certified that error appears in the above-identified patent and that said Letters Patent is hereby corrected as shown below:

On title page, column 2, under Other Publications, line 1, delete ""Guidlines" and insert -- "Guidelines --, therefor.

On title page 2, column 2, under Other Publications, line 7, delete "SERIESfour;" and insert -- SERIES four; --, therefor.

On title page 2, column 2, under Other Publications, line 10, delete "umit.com." and insert -- unit.com. --, therefor.

On title page 2, column 2, under Other Publications, line 12, delete "Entetprises;"" and insert -- Enterprises;" --, therefor.

On title page 3, column 1, under Other Publications, line 8, delete "entriched ifnormation" and insert -- enriched information --, therefor.

On title page 3, column 1, under Other Publications, line 11, delete "Conventry:" and insert -- Coventry: --, therefor.

In the Drawings:

On sheet 8 of 9, in figure 4G, under reference numeral 414, line 1, Delete "relatePriceList" and insert -- relatedPriceList --, therefor.

In the Specification:

In column 1, line 51, delete "fill" and insert -- full --, therefor.

In column 5, line 42-43, delete "pricingdata, shippingdata," and insert -- pricingData, shippingData, --, therefor.

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,473,399 B2

In column 6, line 12, delete "shippingdata," and insert -- shippingData, --, therefor.

In column 7, line 44-48, after "the" delete "invention present may be provided as a computer program product that may include a machine-readable medium having stored thereon instructions, which may be used to program a computer (or other electronic devices) to perform a process according to various embodiments of the".

In column 7, line 53, delete "RAMS," and insert -- RAMs, --, therefor.

In the Claims:

In column 9, line 45, in Claim 9, delete "entities" and insert -- entities, --, therefor.

In column 9, line 50, in Claim 9, delete "element" and insert -- element, --, therefor.

In column 9, line 51, in Claim 9, delete "element" and insert -- element, --, therefor.

In column 9, line 52, in Claim 9, delete "element" and insert -- element, --, therefor.

In column 11, line 14, in Claim 16, delete "claim 12" and insert -- claim 12, --, therefor.